(12) United States Patent
Higashitani et al.

(10) Patent No.: US 8,749,855 B2
(45) Date of Patent: Jun. 10, 2014

(54) COPY MACHINE WITH ELLIPTICAL DIFFUSION PLATES

(75) Inventors: Masahiro Higashitani, Osaka (JP); Kenichiro Kawasaki, Osaka (JP)

(73) Assignee: Kyocera Document Solutions Inc. (JP)

( * ) Notice: Subject to any disclaimer, the term of this patent is extended or adjusted under 35 U.S.C. 154(b) by 710 days.

(21) Appl. No.: 12/974,315

(22) Filed: Dec. 21, 2010

(65) Prior Publication Data

US 2011/0157660 A1    Jun. 30, 2011

(30) Foreign Application Priority Data

Dec. 28, 2009  (JP) ................................ P2009-296871
Dec. 28, 2009  (JP) ................................ P2009-297258

(51) Int. Cl.
*H04N 1/04* (2006.01)
*H01L 27/00* (2006.01)

(52) U.S. Cl.
USPC ........................................ 358/474; 250/208.1

(58) Field of Classification Search
None
See application file for complete search history.

(56) References Cited

U.S. PATENT DOCUMENTS

| | | | |
|---|---|---|---|
| 5,696,607 A | 12/1997 | Yamana et al. | 358/474 |
| 5,902,993 A | 5/1999 | Okushiba et al. | 250/208.1 |
| 7,538,911 B2 | 5/2009 | Sakurai et al. | 358/475 |
| 8,056,807 B2 * | 11/2011 | Lo et al. | 235/454 |
| 8,194,294 B2 | 6/2012 | Tagawa et al. | 358/475 |
| 2004/0131378 A1 * | 7/2004 | Hattori et al. | 399/90 |
| 2005/0088707 A1 | 4/2005 | Sakurai et al. | 358/475 |
| 2005/0248959 A1 * | 11/2005 | Chiou | 362/602 |
| 2009/0244654 A1 | 10/2009 | Tagawa et al. | 358/474 |
| 2009/0290199 A1 | 11/2009 | Tagawa et al. | 358/475 |

FOREIGN PATENT DOCUMENTS

| | | |
|---|---|---|
| JP | 7-193684 | 7/1995 |
| JP | 10-150526 | 6/1998 |
| JP | 2001-171177 | 6/2001 |
| JP | 2005-102112 | 4/2005 |
| JP | 2005-156600 | 6/2005 |
| JP | 2007-214923 | 8/2007 |
| JP | 2008-124891 | 5/2008 |
| JP | 2008-172561 | 7/2008 |
| JP | 2008-180841 | 8/2008 |
| JP | 2009-246462 | 10/2009 |
| JP | 2009-282242 | 12/2009 |

OTHER PUBLICATIONS

Office Action issued in corresponding Japanese Patent Application No. 2009-296871 dated Apr. 17, 2012 (not furnished herewith).
Office Action issued in corresponding Japanese Patent Application No. 2009-297258 dated Apr. 17, 2012 (not furnished herewith).

* cited by examiner

*Primary Examiner* — Benny Q Tieu
*Assistant Examiner* — Sunil Chacko
(74) *Attorney, Agent, or Firm* — Ostrolenk Faber LLP (57) ABSTRACT

A light guide device 31*c* is provided with a plurality of protruding portions 31*c*4 and 31*c*5 that protrude in a light emission direction, and entire end surfaces of these protruding portions 31*c*4 and 31*c*5 that face in the light emission direction form emission end surfaces 31*c*2 and 31*c*3, and a diffusion component is installed on each of these emission end surfaces 31*c*2 and 31*c*3.

7 Claims, 6 Drawing Sheets

COPY MACHINE WITH ELLIPTICAL DIFFUSION PLATES

BACKGROUND OF THE INVENTION

1. Field of the Invention

The present invention relates to an image reading apparatus and an image formation apparatus.

Priority is claimed on Japanese Patent Application No. 2009-296871, filed Dec. 28, 2009 and Japanese Patent Application No. 2009-297258, filed Dec. 28, 2009, the contents of which are incorporated herein by reference.

2. Description of Related Art

An image formation apparatus has, for example, an image reading apparatus that is provided with a light source apparatus which is used to illuminate an original document. There is a light source apparatus with a light source that emits light, and with a light guide (i.e., a light guide device) that guides light emitted from this light source onto an irradiation area. According to this type of image reading apparatus, light emitted from the light source is guided by the light guide and is focused on the irradiation area, and the illuminance of the light in the irradiation area can be increased.

In an image reading apparatus in which the above described light source apparatus is mounted, image data is obtained by using light-receiving sensors such as CCD (charge-coupled devices) and the like to receive feedback light from the original document that is generated as a result of the light from the light source apparatus being irradiated onto the original document. It is assumed that the light that is received by this type of light-receiving sensor is light that has been scattered on the original document. Because of this, when strong light such as light that has been directly reflected from the original document is irradiated onto the light-receiving sensor, image data that differs from the image which is formed on the original document ends up being created, and this prevents superior image data being acquired.

In order to solve this type of problem, an image reading apparatus having a light source apparatus in which a diffusion plate (i.e., a diffusion component) is fitted in the light guide so that strong light that would prevent superior image data being acquired is not contained in the feedback light from the original document is proposed. More specifically, a diffusion plate is fitted at a light emission end surface in a light guide and light emitted from this emission end surface is diffused. As a result, the illuminance distribution of the light that is irradiated onto the original document is uniformized so that the inclusion of strong light intruding into the feedback light is suppressed.

However, in instances such as, for example, when light is irradiated from a plurality of directions onto an original document, there are cases when a plurality of light emission end surfaces is provided in the light guide. In cases such as this, it is preferable for diffusion plates to be provided at all of the emission end surfaces. However, in a conventional image reading apparatus, when a light guide has a plurality of emission end surfaces, the light guide has portions that protrude onto the light emission direction side from the edges of either the emission end surfaces. Because of this, the provision of a diffusion plate over the entire emission end surface in order to avoid any interference between the protruding portions and the diffusion plate has not been possible. In cases such as this in which it is not possible to provide a diffusion plate over an entire emission end surface, a portion of the light emitted from this emission end surface either reaches the original document (i.e., the irradiation area) without passing through the diffusion plate or becomes leakage light. If a portion of the light emitted from an emission end surface reaches the original document (i.e., the irradiation area) without passing through the diffusion plate, then it is not possible to sufficiently uniformize the illuminance distribution of the light irradiated onto the original document (i.e., the irradiation area). Furthermore, if a portion of the light emitted from an emission end surface becomes leakage light, then the efficiency with which the light is utilized is reduced.

Moreover, it is desirable for the illuminance of light in an irradiation area to be high, particularly in an image reading apparatuses installed in an image formation apparatus or the like. In recent years, the use of LED (light emitting diodes) as light sources has been proposed, however, devices that enable a greater quantity of light to be focused onto the irradiation area are being demanded. In addition, in an image reading apparatus provided with light sources and a light guide, in order to more easily increase the light illuminance in an irradiated area, a structure is employed in which a greater quantity of light is acquired inside the light guide by causing the light sources and the light guide to come into mutual contact with each other.

However, because a normal light source generates heat by emitting light, if the light sources are brought into contact with the light guide, the light guide is deformed by the heat from the light sources and there is a possibility that this will interfere with the guiding of light emitted from the light source. In addition, if an LED is brought into contact with a light guide, there is a possibility that the LED will be broken as a result of errors in installation and the like.

SUMMARY OF THE INVENTION

The present invention, conceived to address the above-mentioned points, is an object to further uniformize the illuminance distribution of light and raise the illuminance of the light in an irradiation area while suppressing any reduction in the utilization efficiency of the light in an image reading apparatus that is provided with a light source and a light guide device.

To solve the above-mentioned problems, an image reading apparatus of the present invention includes: a light source that generates light; a light guide device that allows light emitted from the light source to pass internally through itself, and emits this light from a plurality of emission end surfaces; a diffusion component that is placed on the light emission end surfaces of the light guide device; and a light-receiving sensor that detects feedback light that is generated as a result of the light emitted from the light guide device being irradiated onto a subject being read, wherein the light guide device is provided with a plurality of protruding portions that protrude in the light emission direction, and entire end surfaces of the protruding portions that face in the light emission direction make up the emission end surfaces.

According to aspects of the present invention, the light guide device is provided with a plurality of protruding portions that protrude in the light emission direction, and the entire end surfaces of these protruding portions that face in the light emission direction form light emission end surfaces. Namely, according to aspects of the present invention, portions that stick out in the light emission direction from the edges of the light emission end surfaces are not provided. Because of this, the diffusion component can be placed over the entirety of the emission end surface. As a result of this, all of the light emitted from the emission end surface can be made to pass through the diffusion component, and it is possible to minimize any unevenness in the illuminance distribution or any reduction in the light utilization efficiency that are caused by the light not passing through the diffusion component, as is the case conventionally. Accordingly, according to aspects of the present invention, in an image reading apparatus that is provided with a light source and a light guide device, it is possible to make the illuminance distribution of light in an irradiation area more uniform, while at the same time any reduction in the light utilization efficiency that is caused by leakage light can be minimized.

To solve the above-mentioned problems, an image reading apparatus of the present invention includes: a light source that generates light; a light guide device that guides emitted from the light source towards an irradiation area; and a light-receiving sensor that detects feedback light that is generated as a result of the light emitted from the light guide device being irradiated onto a subject being read, wherein there is provided a reflecting device that is placed between the light source and the light guide device, and that reflects a portion of the light emitted from the light source towards the light guide device.

Moreover, according to aspects of the present invention, a reflecting device is provided that reflects a portion of the light emitted from the light source towards the light guide device is placed between the light source and the light guide device. Because of this, according to aspects of the present invention, as a result of a portion of the light that, due to the light source and the light guide device being located apart from each other, has conventionally become leakage light being reflected by the reflecting device towards the light guide device, it is possible to increase the amount of light that is taken into the light guide device. Accordingly, according to aspects of the present invention, in an image reading apparatus which is provided with a light source and a light guide device, it is possible to increase the illuminance of light in an irradiation area without bringing the light source and the light guide device into mutual contact. Moreover, an image formation apparatus of the present invention is the image formation apparatus that includes the image reading apparatus configured as described above.

DETAILED DESCRIPTION OF THE EMBODIMENTS

Hereinafter, an embodiment of the image reading apparatus and image formation apparatus of the present invention will be described with reference made to the drawings. Note that in the drawings described below, the scale of the respective components has been suitably modified in order to make each component a recognizable size. Moreover, in the description given below, a copy machine is described as an example of the image formation apparatus of the present invention.

Figure 1:
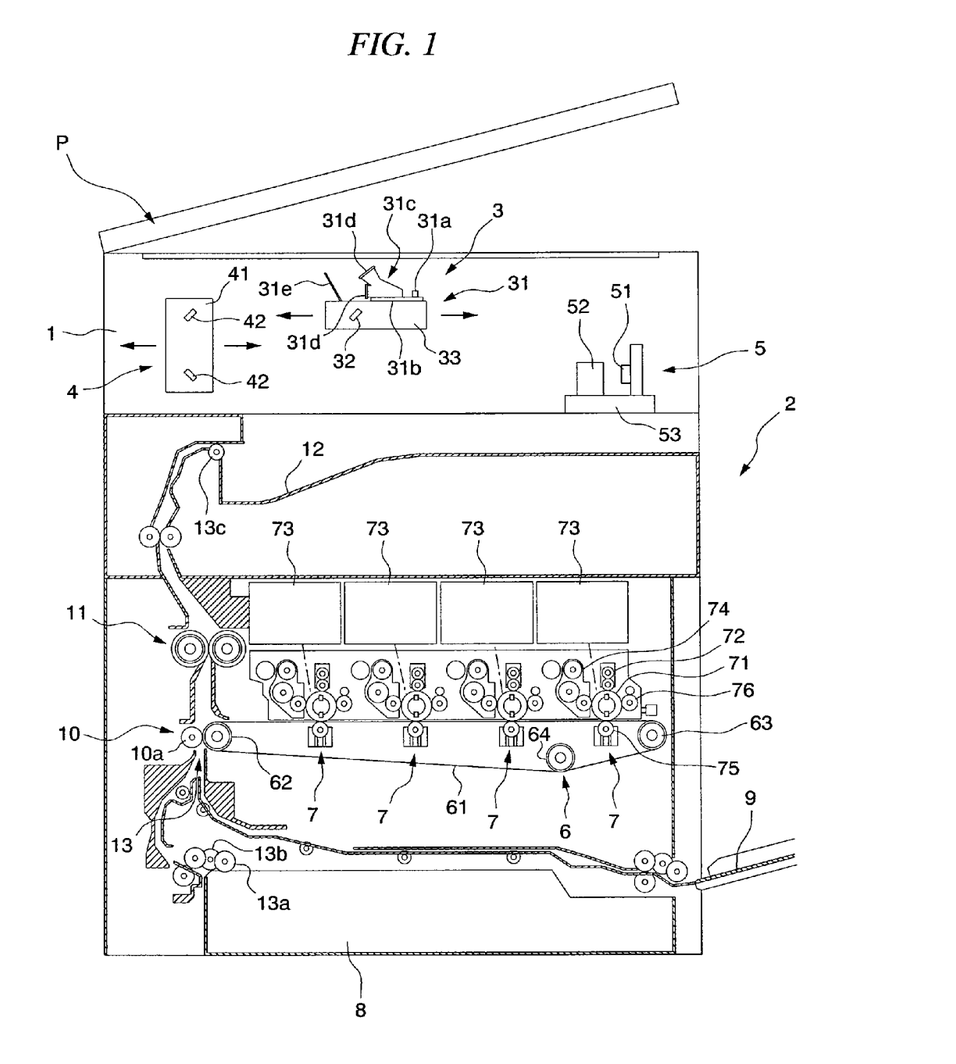
FIG. 1 is a cross-sectional view showing the schematic structure of a copy machine.

FIG. 1 is a cross-sectional view showing the schematic structure of a copy machine P of the present embodiment. As is shown in this drawing, the copy machine P of the present embodiment is provided with an image reading unit 1 (i.e., an image reading apparatus) that reads an image of an original document (i.e., a reading subject), and a printing unit 2 that prints onto recording paper (i.e., a recording medium) based on the read image data.

The image reading unit 1 irradiates light onto an original document image, and by receiving reflected light therefrom reads the original document image as image data. As is shown in FIG. 1, the image reading unit 1 is provided with a light source unit 3, a mirror unit 4, and a light-receiving sensor unit 5.

The light source unit 3 is provided with a light source apparatus 31 that irradiates light towards an original document, a reflection mirror 32 that reflects feedback light from the original document onto the mirror unit 4, and a holding frame 33 that holds the light source apparatus 31 and the reflection mirror 32.

Figure 2:
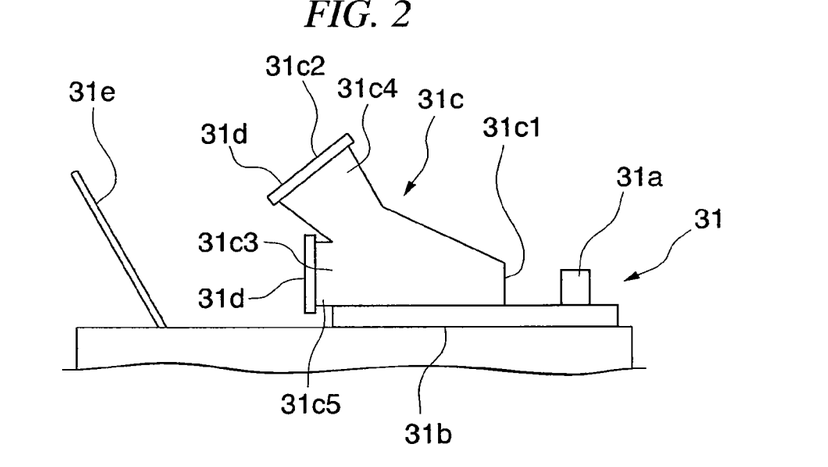
FIG. 2 is an enlarged view of a light source apparatus provided in a copy machine.
Figure 3:
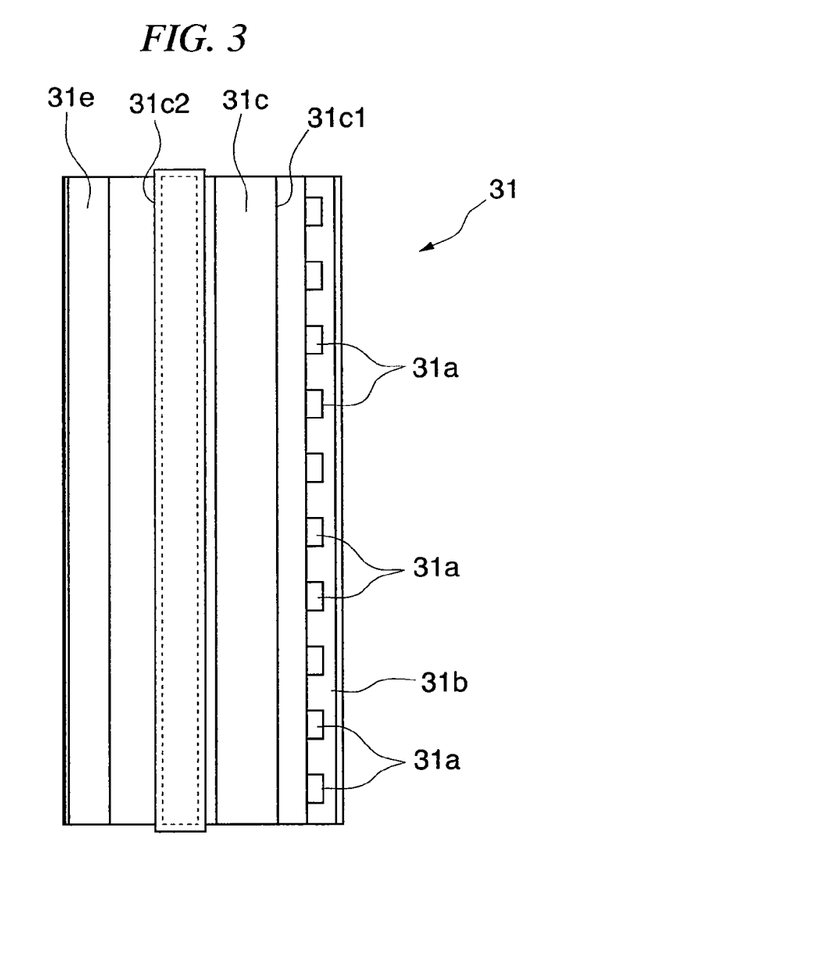
FIG. 3 is an enlarged plan view of a light source apparatus provided in a copy machine.

FIG. 2 is an enlarged view of the light source apparatus 31 shown in FIG. 1. FIG. 3 is an enlarged plan view of the light source apparatus 31. As is shown in these drawings, the light source apparatus 31 is provided with LED 31a (i.e., a light source) that serve as a light source for emitting light, a printed circuit board 31b (i.e., a holding component) that is provided with drive circuits for the LED 31a, a light guide 31c (i.e., a light guide device) that guides light emitted from the LED 31a onto an irradiation area on an original document, elliptical diffusion plates 31d (i.e., diffusion components) that diffuse light emitted from the light guide 31c, and a light guide mirror 31e.

The LED 31a are white LED that emit white light and, as is shown in FIG. 3, a plurality thereof are arrayed in the main scan direction in the copy machine P. These LED 31a are placed such that they face towards the light guide 31c which is packaged on the printed circuit board 31b, and they emit light under the control of a control unit (not shown).

The printed circuit board 31b functions as a holding component for the LED 31a, and a wiring pattern that is used to supply power to the LED 31a is formed thereon. Note that in the present embodiment the printed circuit board 31b holds the light guide 31c together with the LED 31a.

The light guide 31c guides light irradiated from an end surface 31c1 located on the LED 31a side thereof through the interior thereof while reflecting all of this light, and emits a portion of this light towards an original document via an end surface 31c2 that faces an irradiation area of the original document. The remainder of the light is emitted towards the light guide mirror 31e via an end surface 31c3 that faces towards the light guide mirror 31e.

In the copy machine P of the present embodiment, the light guide 31c is provided with a protruding portion 31c4 that protrudes diagonally upwards towards the irradiation area of the original document, and with a protruding portion 31c5 that protrudes in a horizontal direction towards the light guide mirror 31e. In addition, an end surface of the protruding portion 31c4 that faces towards the irradiation area of the original document, namely, an end surface of the protruding portion 31c4 that faces in the light emission direction thereof forms the aforementioned end surface 31c2 (i.e., an emission end surface) that emits light towards the original document. In addition, an end surface of the protruding portion 31c5 that faces towards the light guide mirror 31e, namely, an end surface of the protruding portion 31c5 that faces in the light emission direction thereof forms the aforementioned end surface 31c3 that emits light towards the light guide mirror 31e. Namely, in the copy machine P of the present embodiment, the light guide 31c is provided with the plurality of end surfaces 31c2 and 31c3 that emit light, and is also provided with the plurality of protruding portions 31c4 and 31c5 that protrude in the respective light emission directions. In addition, the end surfaces of the respective protruding portions 31c4 and 31c5 that face in the light emission directions form the end surfaces 31c2 and 31c3 that emit light. According to this type of light guide 31c, as is shown in FIG. 2, because the end surfaces of the protruding portions 31c4 and 31c5 that face in the light emission direction form the end surfaces 31c2 and 31c3 that emit light, the light guide 31c has a shape that does not include portions that protrude from the edges of the end surfaces 31c2 and 31c3 onto the light emission direction side.

An elliptical diffusion plate 31d is provided for each of the end surfaces 31c2 and 31c3 provided in the light guide 31c that emit light, and by diffusing the light that is emitted from the end surface 31c2 and 31c3 and passes through them, the elliptical diffusion plates 31d create a uniform illuminance distribution. The elliptical diffusion plates 31d are fitted such that they cover the entire surface of the end surfaces 31c2 and 31c3. Note that in the present embodiment, the elliptical diffusion plates 31d are anisotropic diffusion components that diffuse light in a main scanning direction which is an orthogonal direction relative to a direction of relative movement (i.e., a sub-scanning direction) between the original document and the light that is irradiated onto the original document. Because of this, light that passes through the elliptical diffusion plates 31d is diffused in the main scanning direction, and, as a result of this, the illuminance distribution in the irradiation area of the original document is uniformized in the main scanning direction.

The light guide mirror 31e reflects light emitted from the end surface 31c3 of the light guide 31c towards the irradiation area of the original document.

The reflection mirror 32 is placed directly below the irradiation area of the original document, and reflects feedback light from the original document towards the mirror unit 4. The holding frame 33 holds the light source apparatus 31 and the reflection mirror 32, as is described above, and is also able to be moved in the sub-scanning direction of the copy machine P by means of a movement apparatus (not shown). In addition, as a result of the holding frame 33 being moved in the sub-scanning direction, the irradiation area of the original document moves in the sub-scanning direction and light is sequentially irradiated onto the entire surface of the original document.

Returning to FIG. 1, the mirror unit 4 guides feedback light from the original document towards the light-receiving sensor unit 5, and is provided with a holding frame 41 that moves in the sub-scanning direction in synchronization with the holding frame 33 of the light source unit 3, and with two reflection mirrors 42 that are held on the holding frame 41 and reflect this feedback light.

The light-receiving sensor unit 5 converts feedback light irradiated thereon via the mirror unit 4 into image data, and is provided with a CCD (charge-coupled device) 51 (i.e., a light-receiving sensor) that converts feedback light into image data, a focusing lens 52 that focuses the feedback light onto the CCD, and a supporting base 53 that supports the CCD 51 and the focusing lens 52.

The printing unit 2 is provided with a belt unit 6, image formation units 7, a paper feed cassette 8, a paper feed tray 9, a secondary transfer unit 10, a fixing unit 11, a paper discharge tray 12, and a transporting path 13.

Toner images formed in the image formation units 7 are transferred onto the belt unit 6, and the belt unit 6 transports these transferred toner images. The belt unit 6 is provided with an intermediate transfer belt 61 onto which toner images are transferred from the image formation units 7, a drive roller 62 that aerially suspends the intermediate transfer belt 61 and also causes it to rotate endlessly, a slave roller 63, and a tension roller 64. The intermediate transfer belt 61 is aerially suspended by the drive roller 62, the slave roller 63, and the tension roller 64. The drive roller 62 is connected to a drive unit having a drive source such as a motor or the like, and causes the intermediate transfer belt 61 to travel around a circuit (successively feeds the intermediate transfer belt 61) while imparting a gripping force thereto. The slave roller 63 is driven to rotate by receiving the rotation drive from the drive roller 62. The tension roller 64 is a type of slave roller that is driven to rotate by receiving the rotation drive from the drive roller 62, and has a spring mechanism that is used to impart tension to the intermediate transfer belt 61. A cleaning unit (not shown) is also provided on the belt unit 6, and this cleaning unit removes any toner or the like left remaining on the intermediate transfer belt 61.

Image formation units 7 are provided to correspond to the respective colors of yellow (Y), magenta (M), cyan (C), and black (BK), and form toner images in their respective colors. In addition, these image formation units 7 are arrayed alongside the intermediate transfer belt 61.

Each image formation unit 7 has a photoconductor 71, a charging unit 72, a laser scanning unit 73, a developing apparatus 74, a primary transfer roller 75, a cleaning apparatus 76, and a static charge eliminator (not shown). The shape of the photoconductor 71 is set as a circular column, and electrostatic latent images and also toner images that are based on these electrostatic latent images are formed on the circumferential surface thereof. The charging unit 72 is positioned facing the photoconductor 71, and keeps the circumferential surface of the photoconductor 71 in a charged state. The laser scanning unit 73 scans laser light which is emitted based on print mode image data onto the circumferential surface of the charged photoconductor 71. The developing apparatus 74 supplies toner to the circumferential surface of the photoconductor 71 so as to develop an image that is based on the electrostatic latent image on the circumferential surface of the photoconductor 71. The primary transfer roller 75 is positioned facing the photoconductor 71 with the intermediate transfer belt 61 sandwiched between them, and performs the primary transfer of the images developed on the photoconductor 71 onto the intermediate transfer belt 61. The cleaning apparatus 76 removes residual toner from on the photoconductor 71 after the primary transfer.

The paper feed cassette 8 can be freely taken out from the apparatus main body and contains recording paper. The paper feed tray 9 can be freely opened and closed relative to the apparatus main body, and contains recording paper. The secondary transfer unit 10 performs the secondary transfer of the images formed on the intermediate transfer belt 61 onto a storage medium, and is configured with the drive roller 62 which drives the intermediate transfer belt 61, and with a secondary transfer roller 10a that is positioned facing the drive roller 62 with the intermediate transfer belt 61 sandwiched between them. The fixing unit 11 fixes onto recording paper the toner image that has undergone the secondary transfer onto the storage medium, and is provided with a heating roller that fixes the toner image onto the recording paper by applying pressure and heat. The transporting path 13 is provided with a pickup roller 13a that transports recording paper out from the paper feed cassette 8, a paper supply roller 13b that transports the storage medium, and a paper discharge roller 13c that discharges the storage medium to the paper discharge tray 12.

As is described above, the copy machine P of the present embodiment which has the above described structure is provided with the light source apparatus 31, the CCD 51, and the printing unit 2. Light that is emitted from the light source apparatus 31 is irradiated onto an original document and feedback light therefrom is converted into image data in the CCD 51. The printing unit 2 then creates a print on recording paper based on this image data.

In addition, in the copy machine P of the present embodiment, the light guide 31c is provided with the plurality of end surfaces 31c2 and 31c3 that emit light, and is also provided with the plurality of protruding portions 31c4 and 31c5 that protrude in the emission direction of the respective light paths. In addition, the end surfaces of the respective protruding portions 31c4 and 31c5 that face in the light emission direction form the end surfaces 31c2 and 31c3 that emit light. Namely, the light guide 31c in the copy machine P of the present embodiment is shaped such that it does not have portions that stick out on the light emission direction side from the edges of the relevant end surfaces 31c2 and 31c3. Because of this, the elliptical diffusion plates 31d are able to be placed over the entirety of the end surfaces 31c2 and 31c3 which form the emission end surfaces. As a result of this, all of the light emitted from the emission end surfaces can be made to pass through the elliptical diffusion plates 31d, and it is possible to minimize any unevenness in the illuminance distribution or any reduction in the light utilization efficiency that are caused by the light not passing through the diffusion plate, as is the case conventionally. Accordingly, in a light source apparatus 31 that is provided with light sources and a light guide, and in a copy machine P which is provided with this light source apparatus 31, it is possible to make the illuminance distribution of light in an irradiation area more uniformized, while at the same time any reduction in the light utilization efficiency that is caused by leakage light can be suppressed.

Moreover, in the present embodiment the LED 31a are used as light sources. Because of this, it is possible to achieve reductions in both the size and the weight of the light source apparatus 31 and the copy machine P. Note that when the LED 31a are used as light sources, because the light sources are point light sources, the light emitted from the light sources has increased rectilinearity, and it is easy for fluctuations to occur in the illuminance distribution. To counter this, in the light source apparatus 31 and copy machine P of the present embodiment, by providing the elliptical diffusion plates 31d, even if the LED 31a are used as light sources, it is possible to diffuse the emitted light and suppress fluctuations in the illuminance distribution.

Moreover, in the present embodiment the elliptical diffusion plates 31d are anisotropic diffusion components that diffuse light in a main scanning direction which is an orthogonal direction relative to a sub-scanning direction which is the direction of relative movement between the original document and the light that is irradiated onto the original document. Because of this, the light that passes through the elliptical diffusion plates 31d is diffused in the main scanning direction, and it is thereby possible to improve the light utilization efficiency.

Next, another embodiment of the image reading apparatus and image formation apparatus of the present invention will be described with reference made to FIG. 4 through FIG. 9.

Figure 4:
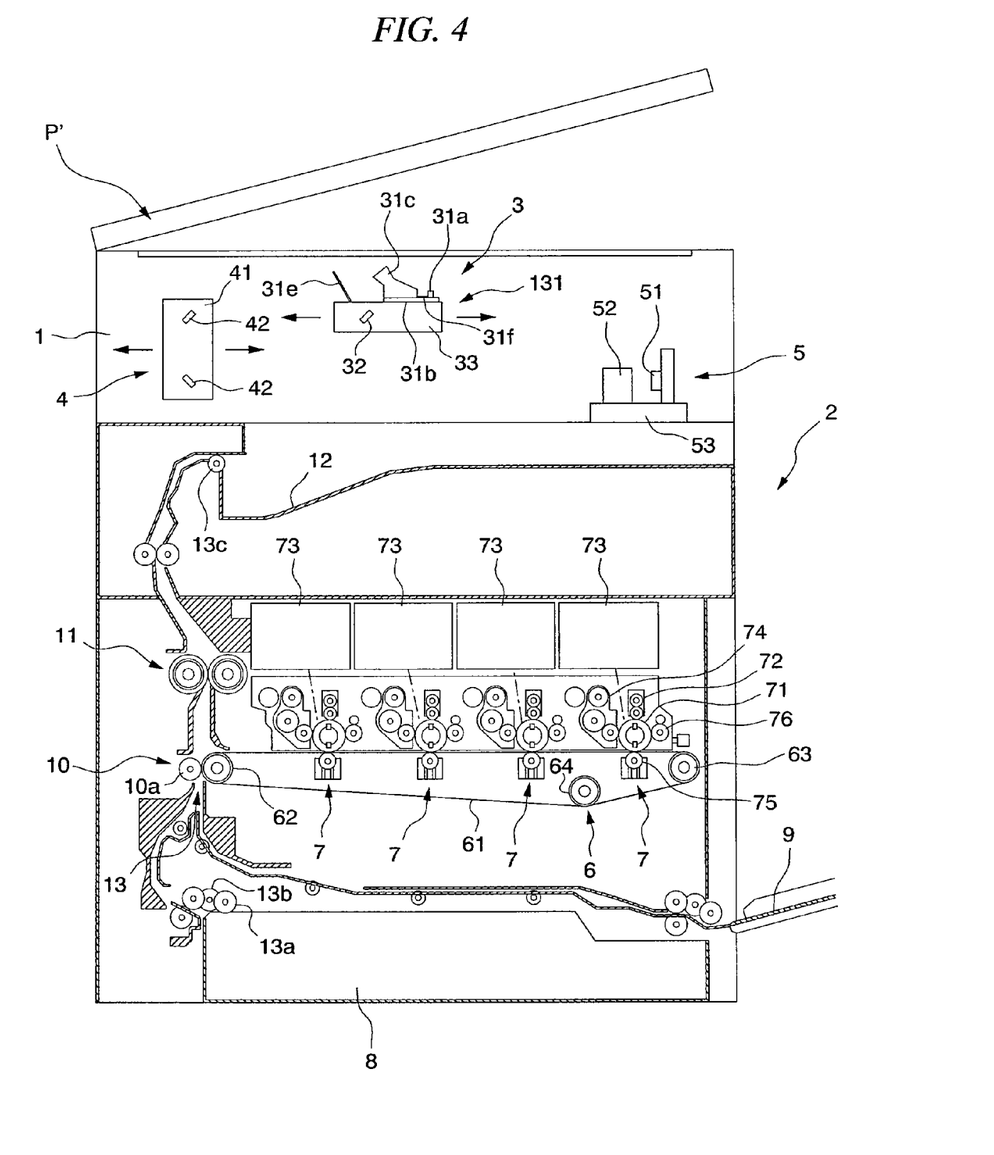
FIG. 4 is a cross-sectional view showing the schematic structure of a copy machine.

FIG. 4 is a cross-sectional view showing the schematic structure of a copy machine P' of the present embodiment. This copy machine P' differs from the copy machine P shown in FIG. 1 in the structure of the light source apparatus 31.

Figure 5:
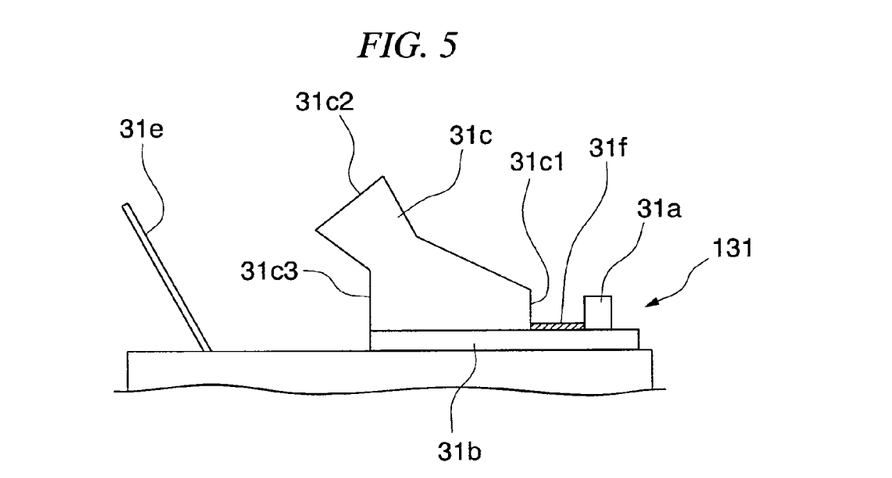
FIG. 5 is an enlarged view of a light source apparatus provided in a copy machine.
Figure 6:
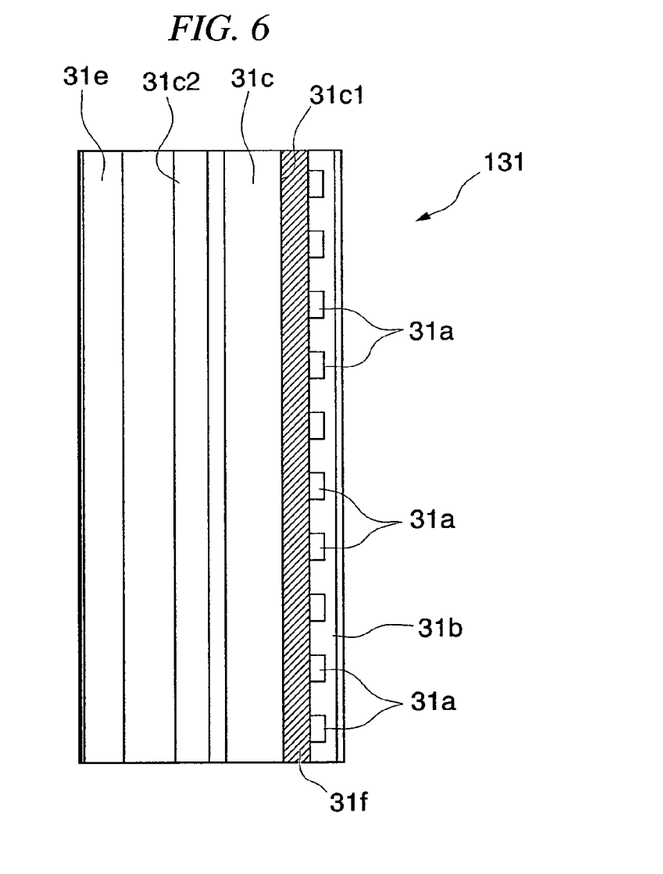
FIG. 6 is an enlarged plan view of a light source apparatus provided in a copy machine.

FIG. 5 is an enlarged view of a light source apparatus 131 shown in FIG. 4. FIG. 6 is an enlarged plan view of the light source apparatus 131. Component elements that are the same as those in the above described embodiment are given the same descriptive symbols and any description thereof is either simplified or omitted. As is shown in FIG. 5 and FIG. 6, the light source apparatus 131 is provided with a reflecting portion 31f (i.e., a reflecting device) that is placed between the LED 31a and the light guide 31c.

The reflecting portion 31f is placed between the LED 31a and the light guide 31c, and reflects a portion of the light that is emitted from the LED 31a towards the end surface 31c1 of the light guide 31c. Note that the reflecting portion 31f reflects leakage light that has conventionally leaked out from the gap between conventional LED 31a and the light guide 31c when the reflecting portion 31f has not been present towards the light guide 31c. In the present embodiment, the reflecting portion 31f is formed from the copper foil that is normally provided on the printed circuit board 31b. More specifically, when a wiring pattern is being formed on the printed circuit board 31b by etching, an area that corresponds to the reflecting portion 31f is left electrically isolated from the wiring pattern, and this area is ultimately formed into the reflecting portion 31f by creating a mirror finish thereon. In this manner, in the present embodiment, the reflecting portion 31f is provided on the printed circuit board 31b which holds the LED 31a and the light guide 31c. Furthermore, as is shown in FIG. 6, in the present embodiment the reflecting portion 31f is provided extending across the entire area between the LED 31a and the light guide 31c. By doing this, at least a portion of the light emitted from all of the LED 31a is reflected towards the light guide 31c.

In the copy machine P' of the present embodiment, the light source apparatus 131 is placed between the LED 31a and the light guide 31c, and the reflecting portion 31f is provided that reflects a portion of the light emitted from the LED 31a towards the light guide 31c. Because of this, according to the copy machine P' of the present embodiment, as a result of a portion of the light that, due to the LED 31a and the light guide 31c being located apart from each other, has conventionally become leakage light being reflected by the reflecting portion 31f towards the light guide 31c, it is possible to increase the amount of light that is taken into the light guide 31c. Accordingly, according to the copy machine P' of the present embodiment, in the image reading unit 1 which is provided with light sources and a light guide device, any deformation of the light guide 31c by the heat generated from the LED 31a is prevented, and it is possible to increase the illuminance of light in an irradiation area because of the separating between the LED 31a and the light guide 31c.

Figure 7:
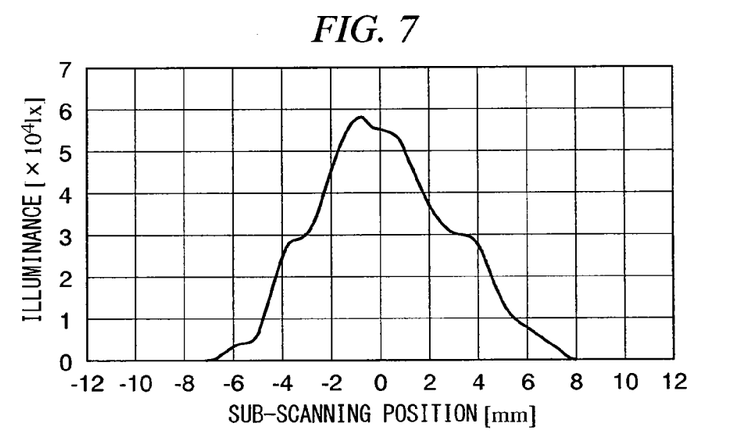
FIG. 7 is comparative experiment data that is used to make comparisons with the illuminance distribution of an image reading apparatus provided in a copy machine.
Figure 8:
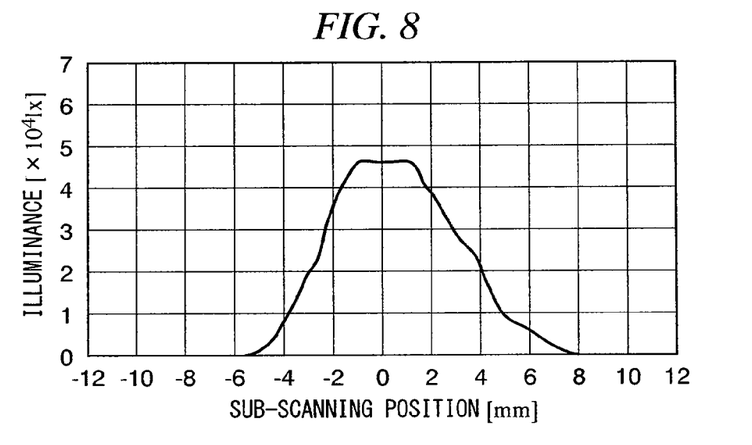
FIG. 8 is comparative experiment data that is used to make comparisons with the illuminance distribution of an image reading apparatus provided in a copy machine.
Figure 9:
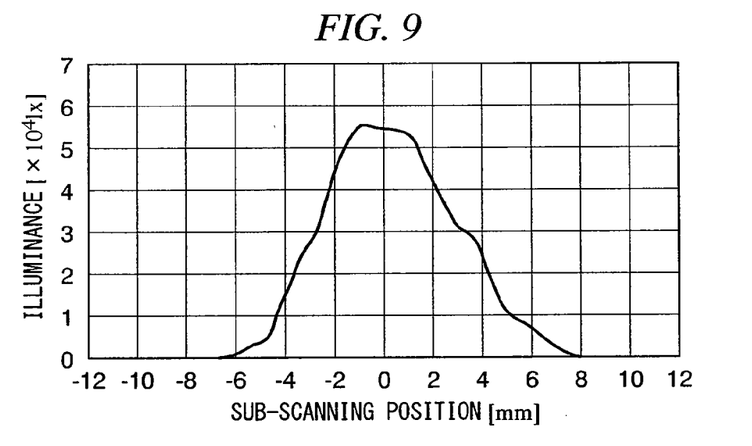
FIG. 9 is experiment data that shows the illuminance distribution of an image reading apparatus provided in a copy machine.

FIG. 7 through FIG. 9 are graphs showing the results of experiments performed in order to corroborate the effectiveness of the image reading unit 1 that is provided in the copy machine P of the present embodiment. Note that in FIG. 7 through FIG. 9, the vertical axis shows the illuminance, while the horizontal axis shows the position in the sub-scanning direction. Moreover, these experiments were conducted with the height of the end surface 31c1 of the light guide 31c set to 1.3 mm, the height of the LED 31a set to 0.8 mm, and the separation distance when the light guide 31c is separated from the LED 31a set to 0.6 mm. FIG. 7 is a graph showing the illuminance distribution when the LED 31a and the light guide 31c were in close mutual contact. FIG. 8 is a graph showing the illuminance distribution when the LED 31a and the light guide 31c were separated from each other and the reflecting portion 31f was not provided. FIG. 9 is a graph showing the illuminance distribution in the light source apparatus 131 of an image reading unit 1 provided in the copy machine P' of the present embodiment. As can be seen from FIG. 7 through FIG. 9, the peak value of the illuminance (46358 1x) when the LED 31a and the light guide 31c were mutually separated and the reflecting portion 31f was not provided was considerably lower (a reduction to approximately 80%) compared to the peak value of the illuminance (55718 1x) when the LED 31a and the light guide 31c were placed in close mutual contact. In contrast, the peak value of the illuminance (54931 1x) of the image reading unit 1 provided in the copy machine P' of the present embodiment was approximately the same as the peak value of the illuminance (55718 1x) when the LED 31a and the light guide 31c were placed in close mutual contact. Namely, according to the copy machine P' of the present embodiment, it was confirmed that in an image reading unit that is provided with light sources and a light guide device, the illuminance of the light irradiated onto an irradiation area without the light source and the light guide device being brought into mutual contact was raised to approximately the same level as when the light source and the light guide device were brought into mutual contact.

Moreover, in the image reading unit 1 that is provided in the copy machine P' of the present embodiment, the reflecting portion 31f is provided on the printed circuit board 31b which holds the LED 31a and the light guide 31c. Because of this, it is not necessary to provide a separate holding portion to hold the reflecting portion 31f, and it is possible to simplify the apparatus structure and also obviate any increase in manufacturing costs that may be caused by the reflecting portion 31f being installed.

Moreover, in the image reading unit 1 that is provided in the copy machine P' of the present embodiment, a structure is employed in which the reflecting portion 31f is formed by copper foil (i.e., a metal foil) that is provided on the printed circuit board 31b. Because of this, the reflecting portion 31f can be formed as part of the process to form a wiring pattern on the printed circuit board 31b, and it is thus possible to obviate any increase in manufacturing costs that may be caused by the reflecting portion 31f being installed.

Moreover, in the image reading unit 1 that is provided in the copy machine P' of the present embodiment, the reflecting portion 31f is provided so as to extend over the entire area between the LED 31a and the light guide 31c. Because of this, at least a portion of the light emitted from all of the LED 31a is reflected towards the light guide 31c, and a greater quantity of light is able to be taken into the light guide 31c.

Figure 10:
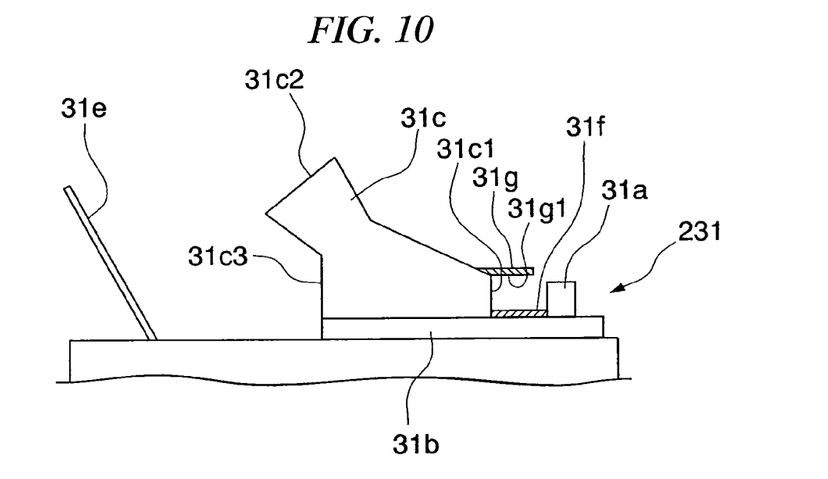
FIG. 10 is an enlarged view of a light source apparatus provided in a copy machine.
Figure 11:
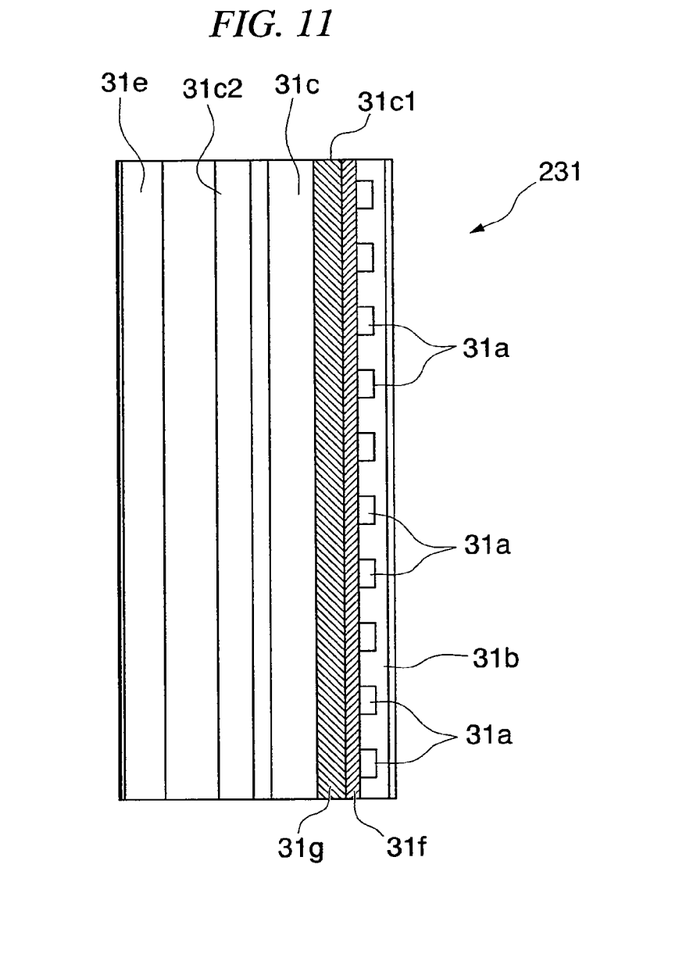
FIG. 11 is an enlarged plan view of a light source apparatus provided in a copy machine.

FIG. 10 is an enlarged view of a light source apparatus 231 which serves as another example of the light source apparatus provided in the copy machine P' of the present embodiment. FIG. 11 is an enlarged plan view of the light source apparatus 231. Component elements that are the same as those in the above described embodiments are given the same descriptive symbols and any description thereof is either omitted or simplified.

As is shown in FIG. 10 and FIG. 11, in addition to the reflecting portion 31f, the light source apparatus 231 is provided with a reflecting portion 31g that serves as a reflecting device to reflect light from the LED 31a and guide it to the end surface 31c1 of the light guide 31c. Compared with a structure in which only the reflecting portion 31f is provided, a structure in which the plurality of reflecting portions 31f and 31g are provided makes it possible to limit light leakage and guide a greater quantity of light to the light guide 31c.

In FIG. 10, the reflecting portion 31g is supported on the light guide 31c. For example, one end of the reflecting portion 31g may be attached to the vicinity of the edge of the end surface 31c1 of the light guide 31c. The reflecting portion 31g extends from the light guide 31c towards the LED 31a. As an alternative to this, the reflecting portion 31g can be also supported by a component other than the light guide 31c.

In FIG. 10, the other end of the reflecting portion 31g is placed close to the LED 31a but in a state of non-contact with the LED 31a. This placement of the reflecting portion 31g and the LED 31a in a state of mutual non-contact prevents any direct transmission of heat from the LED 31a to the reflecting portion 31g. This type of non-contact structure is beneficial in preventing any deformation of the light guide 31c due to the heating effect of the LED 31a. As an alternative to this, it is possible to employ a structure in which at least a portion of the reflecting portion 31g is in contact with the LED 31a and to complete the effect described above.

The reflecting portion 31g has a reflecting surface 31g1 that is positioned facing the reflecting surface of the reflecting portion 31f and is also separated therefrom. A portion of the light from the LED 31a is reflected by the reflecting surface of the reflecting portion 31f, and a portion of the light is reflected by the reflecting surface 31g1 of the reflecting portion 31g. The light from the LED 31a either directly strikes the end surface 31c1 of the light guide 31c, or is reflected at least once by the reflecting portion 31f and/or the reflecting surface 31g1 and then strikes the end surface 31c1 of the light guide 31c. If at least a portion of the opening between the LED 31a and the light guide 31c is covered by the reflecting portion 31g, then it is possible to limit the leakage of light from the LED 31a.

In FIG. 10, the reflecting surface 31g 1 of the reflecting portion 31g is essentially parallel with the reflecting surface of the reflecting portion 31f. Namely, the tilt (i.e., the angle of inclination) of the reflecting surface 31g1 of the reflecting portion 31g relative to the reflecting surface of the reflecting portion 31f is essentially zero. As an alternative to this, it is also possible for the reflecting surface 31g1 of the reflecting portion 31g to be tilted (i.e., to be on an angle of inclination) relative to the reflecting surface of the reflecting portion 31f. Optimizing the angle of inclination can be beneficial in focusing light on the light guide 31c. As an alternative or in addition to this, it is possible for the reflecting surface 31g1 of the reflecting portion 31g to have a curved surface and/or a multi-surface structure.

In FIG. 11, the reflecting portion 31g extends alongside the top edge (i.e., the edge on the original document side) of the end surface 31c1 of the light guide 31c. The reflecting portion 31g broadly covers the end surface 31c1 of the light guide 31c over the entire width direction of the light guide 31c. At least a portion of the opening between the LED 31a and the light guide 31c is shielded by the reflecting portion 31g.

In FIG. 11, a gap is provided between the reflecting portion 31g and the LED 31a. Gas is able to escape to the outside via this gap from, for example, the interior of the optical path space between the LED 31a and the light guide 31c. The movement of gas through the gap between the reflecting portion 31g and the LED 31a aids in restricting any increase in the temperature of the optical path space. This is beneficial in preventing any deformation of the light guide 31c due to the effects of heat.

In this manner, in the structures shown in FIG. 10 and FIG. 11, it is possible to effectively restrict the leakage of light from the LED 31a by means of the plurality of reflecting portions 31f and 31g so that, as a result, the amount of light striking the light guide 31c can be increased.

Embodiments of the present invention have been described above with reference made to the attached drawings, however, the present invention is not limited to the above described embodiments. The various configurations and combinations of the respective component elements illustrated in the above described embodiments are merely examples thereof, and various modifications may be made thereto based on design requirements and the like insofar as they do not depart from the spirit or scope of the present invention.

For example, in the above described embodiments a structure has been described in which the image reading unit 1 is installed in a copy machine which is a type of image formation apparatus, however, the image reading unit 1 may also be installed in another apparatus such as, for example, a scanner or a biological authentication apparatus.

Moreover, in the above described embodiments, a structure in which the image formation apparatus is a copy machine has been described, however, it is also possible for the image formation apparatus to be a multifunction machine which includes a copy machine.

Moreover, in the above described embodiments, a structure has been described in which the light guide 31c is provided with the two protruding portions 31c4 and 31c5, and is further provided with the end surfaces 31c2 and 31c3 that emit light, however, it is also possible to employ a structure in which the light guide is provided with a further plurality of protruding portions, and is also provided with a further plurality of end surfaces that emit light.

Moreover, in the above described embodiments, a structure has been described in which the diffusion component is a plate-shaped diffusion plate, however, it is possible to use a desired shape for the diffusion component.

Moreover, in the above described embodiments, a structure has been described in which the reflecting device is the reflecting portion 31f that is formed by copper foil that is provided on the printed circuit board 31b, however, it is also possible to employ a structure in which a separate mirror or the like is provided and this mirror is used for the reflecting portion 31f.

Moreover, in the above described embodiments, a structure has been described in which the reflecting portion 31f is provided on the printed circuit board 31b that holds the LED 31a and the light guide 31c, however, it is also possible to provide, for example, separate holding components that respectively hold the LED 31a and the light guide 31c, and to place the reflecting portion 31f on either of these holding components. In addition, it is also possible to provide as a separate apparatus a holding component that only holds the reflecting portion 31f.

Moreover, in the above described embodiments, a structure has been described in which the reflecting portion 31f is provided extending over the entire area between the LED 31a and the light guide 31c, however, it is also possible to employ a structure in which reflecting portions 31f are distributed over portions of the area between the LED 31a and the light guide 31c.

What is claimed is:

1. An image reading apparatus comprising:
a light source that generates light;
a light guide device that allows light emitted from the light source to pass internally through itself, and emits this light from a plurality of emission end surfaces;
a diffusion component that is placed on the light emission end surfaces of the light guide device;
a light-receiving sensor that detects feedback light that is generated as a result of the light emitted from the light guide device being irradiated onto a subject being read; and
a reflecting device that is placed between the light source and the light guide device and that reflects a portion of the light emitted from the light source towards the light guide device,
wherein
the light guide device is provided with a plurality of protruding portions that protrude in the light emission direction,
entire end surfaces of the protruding portions that face in the light emission direction make up the emission end surfaces, and
the reflecting device comprises a lower reflecting portion having a reflecting surface and an upper reflecting portion having a reflecting surface, the upper reflecting portion covers at least a portion of an opening between the light source and the light guide device, and the reflecting surface of the upper reflecting portion is arranged to face at least a portion of the reflecting surface of the lower reflecting portion.

2. The image reading apparatus according to claim 1, wherein the light source is LED.

3. The image reading apparatus according to claim 1, wherein
the diffusion component is an anisotropic diffusion component that diffuses the light in a direction that is orthogonal relative to a direction of relative movement between an original document that is serving as the subject being read and the light that is irradiated onto the original document.

4. The image reading apparatus according to claim 1, wherein there is provided a holding component that holds at least one of the light source and the light guide device, and the lower reflecting portion is fitted on top of the holding component.

5. The image reading apparatus according to claim 4, wherein the holding component is a printed circuit board, and the lower reflecting portion is formed by metal foil which forms a part of the printed circuit board.

6. The image reading apparatus according to claim 1, wherein the lower reflecting portion and the upper reflecting portion are provided over the entire area between the light source and the light guide device.

7. An image formation apparatus comprising:
an image reading apparatus that is provided with a light source apparatus that irradiates light onto an original document that is serving as a subject to be read, and with a light-receiving sensor that receives feedback light from the original document and acquires it as image data; and
a printing unit that prints onto a recording medium based on the image data, wherein
the image formation apparatus is provided with the image reading apparatus according to claim 1 as the image reading apparatus.

* * * * *